US012575568B2

(12) United States Patent
Cheng et al.

(10) Patent No.: US 12,575,568 B2
(45) Date of Patent: Mar. 17, 2026

(54) COMPOSITION FOR PROMOTING THE GROWTH OF LEGUMES

(71) Applicant: CH BIOTECH R&D CO., LTD., Nantou (TW)

(72) Inventors: Ting-Wen Cheng, Nantou City (TW); Cho-Chun Huang, Nantou City (TW); Gui-Jun Li, Nantou City (TW); Kai Xia, Nantou City (TW); Chen-Pang Wu, Ontario, CA (US)

(73) Assignee: CH BIOTECH R&D CO., LTD., Nantou City (TW)

( * ) Notice: Subject to any disclaimer, the term of this patent is extended or adjusted under 35 U.S.C. 154(b) by 645 days.

(21) Appl. No.: 17/973,639

(22) Filed: Oct. 26, 2022

(65) Prior Publication Data

US 2024/0156092 A1     May 16, 2024

(51) Int. Cl.
*A01N 37/48*        (2006.01)
*A01N 25/30*        (2006.01)

(52) U.S. Cl.
CPC ............. *A01N 37/48* (2013.01); *A01N 25/30* (2013.01)

(58) Field of Classification Search
CPC ................................ A01N 37/48; A01N 25/30
See application file for complete search history.

(56) References Cited

U.S. PATENT DOCUMENTS

2013/0267420 A1*  10/2013  Ng .......................... A01N 33/12
                                                                  504/140
2017/0112131 A1*   4/2017  Meadows .............. A01N 37/10

* cited by examiner

*Primary Examiner* — Zohreh A Fay
(74) *Attorney, Agent, or Firm* — Troutman Pepper Locke LLP; Tim Tingkang Xia, Esq.

(57)                     ABSTRACT

The invention relates to a composition for promoting the growth of legumes. The composition includes auxin, choline chloride and γ-aminobutyric acid (GABA). The invention also relates to a method for promoting the growth of legumes.

18 Claims, 11 Drawing Sheets

Test Group

Control Group

Control Group                         Test Group

Control Group        Test Group

COMPOSITION FOR PROMOTING THE GROWTH OF LEGUMES

BACKGROUND OF THE INVENTION

1. Field of the Invention

The present invention relates to a composition for promoting the growth of legumes. More particularly, the present invention relates to a composition including auxin, choline chloride, and γ-aminobutyric acid (GABA).

2. Description of the Prior Art

Soybean, one of the world's most popular crop plants, has the ability to derive most of its nitrogen requirements from symbiotic nitrogen fixation. Root nodule symbiosis is a mutualistic interaction observed between mainly leguminous plants and nitrogen-fixing rhizobia, in which plants can obtain fixed atmospheric nitrogen, and provide rhizobia with photosynthate as a carbon source. High yielding soybean depends on adequate biological nitrogen fixation.

Soil-born *Rhizobium* (natural populations) were frequently reported not possessing highly efficient nitrogen-fixing ability within symbiotic soybean plants due to their inherent nitrogen-fixing capabilities, low affinities between mutual symbionts, or small sized *Rhizobium* populations.

Inoculation of legume seeds or soils around the seeds with *Rhizobium* is a common practice to ensure biological nitrogen fixation. However, the inoculation does not frequently bring the yields increased for granted on account of several reasons:

(1) The selected *Rhizobium* inoculant is not affiliated with certain cultivars of the legumes.

(2) The additive *Rhizobium* inoculant is not adapted to local soil factors, such as pH, soil water content, organic matter, and soil texture.

(3) The selected *Rhizobium* inoculant is successfully symbiotic with leguminous plants yet produce insufficient nitrogen.

Therefore, it is necessary to develop new methods for promoting growth of root nodule to increase the growth and yields of leguminous plants.

SUMMARY OF THE INVENTION

In one aspect, the present invention relates to a concentrate composition for promoting the growth of legumes. The concentrate composition comprises between about 0.02 g/L to about 50 g/L auxin, between about 0.2 g/L to about 500 g/L choline chloride, and between about 0.2 g/L to about 500 g/L γ-aminobutyric acid (GABA).

In another aspect, the present invention relates to a ready-to-use composition for promoting the growth of legumes. The ready-to-use composition comprises between about 0.2 mg/L to about 500 mg/L auxin, between about 2 mg/L to about 5000 mg/L choline chloride, and between about 2 mg/L to about 5000 mg/L GABA.

In another aspect, the present invention relates to a method for promoting the growth of legumes.

The present invention is illustrated but not limited by the following embodiments and drawings.

DETAILED DESCRIPTION OF THE PREFERRED EMBODIMENT

Figures 1A, 1B:
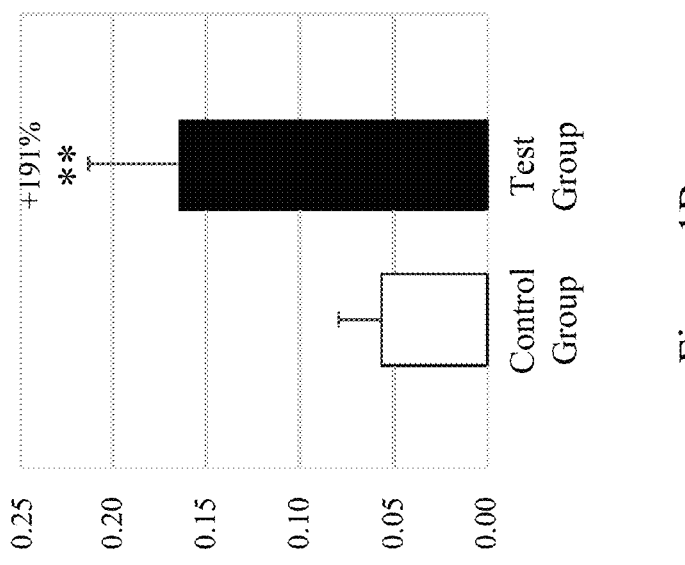
FIG. 1A shows the average nodule number per soybean plant on Day 25 after sowing (R1 stage, beginning flowering) in Example 1 (N=10).
FIG. 1B shows the average nodule weight per soybean plant on Day 25 after sowing (R1 stage, beginning flowering) in Example 1 (N=5). The number above the bar of the Test group indicates the percentage increase compared to the control group. **$p<0.01$.

The inventors of the present invention surprisingly found that when a composition comprising exogenous auxin, choline chloride, and γ-aminobutyric acid (GABA) is applied to a leguminous plant, the composition significantly promotes the growth of nodule of the plant and thereby promotes the growth of the plant and increases yields of the plant.

Therefore, the present invention provides a composition for promoting the growth of legumes. In some embodiments, the composition for promoting the growth of legumes of the present invention is a concentrate composition, comprising between about 0.02 g/L to about 50 g/L auxin, between about 0.2 g/L to about 500 g/L choline chloride, and between about 0.2 g/L to about 500 g/L GABA. A concentrate composition/solution refers to a composition/solution which is intended to be diluted with water to form a use solution prior to application to the plant.

In some embodiments, the concentration of auxin in the concentrate composition is between about 0.02 g/L to about 50 g/L, between about 0.05 g/L to about 25 g/L, between about 0.1 g/L to about 10 g/L, and preferably is, but is not limited to, about 0.02 about 0.05, about 0.08, about 0.1, about 0.25, about 0.5, about 0.75, about 1, about 2.5, about 5, about 7.5, about 10, about 15, about 20, about 25, about 30, about 35, about 40, about 45, about 50 g/L, or any concentration between about 0.02 g/L to about 50 g/L, but is not limited to an integer concentration, such as about 0.73 g/L, about 6.47 g/L, and about 28.69 g/L. In some embodiments, the concentration of auxin in the concentrate composition is about 0.1 g/L, or about 1.5 g/L, or about 5 g/L, or about 6 g/L, or about 7.5 g/L, or about 10 g/L.

In some embodiments, the concentration of choline chloride in the concentrate composition is between about 0.2 g/L to about 500 g/L, between about 0.5 g/L to about 250 g/L, between about 1 g/L to about 100 g/L, and preferably is, but is not limited to, about 0.2 about 0.5, about 0.8, about 1, about 2.5, about 5, about 7.5, about 10, about 25, about 50, about 75, about 100, about 150, about 200, about 250, about 300, about 350, about 400, about 450, about 500 g/L, or any concentration between about 0.2 g/L to about 500 g/L, but is not limited to an integer concentration, such as about 9.13 g/L, about 48.38 g/L, and about 263.74 g/L. In some embodiments, the concentration of choline chloride in the concentrate composition is about 1 g/L, or about 20 g/L, or about 30 g/L, or about 50 g/L, or about 75 g/L, or about 80 g/L, or about 100 g/L.

In some embodiments, the concentration of GABA in the concentrate composition is between about 0.2 g/L to about 500 g/L, between about 0.5 g/L to about 250 g/L, between about 1 g/L to about 100 g/L, and preferably is, but is not limited to, about 0.2 about 0.5, about 0.8, about 1, about 2.5, about 5, about 7.5, about 10, about 25, about 50, about 75, about 100, about 150, about 200, about 250, about 300, about 350, about 400, about 450, about 500 g/L, or any concentration between about 0.2 g/L to about 500 g/L, but is not limited to an integer concentration, such as about 4.67 g/L, about 63.71 g/L, and about 395.36 g/L. In some embodiments, the concentration of GABA in the concentrate composition is about 1 g/L, or about 10 g/L, or about 25 g/L, or about 50 g/L, or about 60 g/L, or about 75 g/L, or about 100 g/L.

In some embodiments, the concentrate composition for promoting the growth of legumes is diluted around 20 folds to around 500 folds, for example but is not limited to around 20 folds, around 30 folds, around 40 folds, around 50 folds, around 60 folds, around 70 folds, around 80 folds, around 90 folds, around 100 folds, around 125 folds, around 150 folds, around 175 folds, around 200 folds, around 225 folds, around 250 folds, around 275 folds, around 300 folds, around 325 folds, around 350 folds, around 375 folds, around 400 folds, around 425 folds, around 450 folds, around 475 folds, around 500 folds, with a solvent before use to form a use solution. In some embodiments, the concentrate composition for promoting the growth of legumes is diluted with water before use.

In some embodiments, the composition for promoting the growth of legumes of the present invention is a ready-to-use composition, comprising between about 0.2 mg/L to about 500 mg/L auxin, between about 2 mg/L to about 5000 mg/L choline chloride, and between about 2 mg/L to about 5000 mg/L GABA. A ready-to-use composition/solution is not diluted with a solvent, such as water, prior to application to the plant. A ready-to-use composition/solution is a use composition/solution when it is applied to the plant without further dilution.

In some embodiments, the concentration of auxin in the ready-to-use composition is between about 0.2 mg/L to about 500 mg/L, between about 0.5 mg/L to about 250 mg/L, between about 1 mg/L to about 100 mg/L, and preferably is, but is not limited to, about 0.2 about 0.5, about 0.8, about 1, about 2.5, about 5, about 7.5, about 10, about 25, about 50, about 75, about 100, about 150, about 200, about 250, about 300, about 350, about 400, about 450, about 500 mg/L, or any concentration between about 0.2 mg/L to about 500 mg/L, but is not limited to an integer concentration, such as about 1.38 mg/L, about 18.63 mg/L, and about 247.92 mg/L. In some embodiments, the concentration of auxin in the ready-to-use composition is about 1 mg/L, or about 15 mg/L, or about 50 mg/L, or about 60 mg/L, or about 75 mg/L, or about 100 mg/L.

In some embodiments, the concentration of choline chloride in the ready-to-use composition is between about 2 mg/L to about 5000 mg/L, between about 5 mg/L to about 2500 mg/L, between about 10 mg/L to about 1000 mg/L, and preferably is, but is not limited to, about 2 about 5, about 8, about 10, about 25, about 50, about 75, about 100, about 250, about 500, about 750, about 1000, about 1500, about 2000, about 2500, about 3000, about 3500, about 4000, about 4500, about 5000 mg/L, or any concentration between about 2 mg/L to about 5000 mg/L, but is not limited to an integer concentration, such as about 91.48 mg/L, about 427.54 mg/L, and about 2463.83 mg/L. In some embodiments, the concentration of choline chloride in the readyto-use composition is about 10 mg/L, or about 200 mg/L, or about 300 mg/L, or about 500 mg/L, or about 750 mg/L, or about 800 mg/L, or about 1000 mg/L.

In some embodiments, the concentration of GABA in the ready-to-use composition is between about 2 mg/L to about 5000 mg/L, between about 5 mg/L to about 2500 mg/L, between about 10 mg/L to about 1000 mg/L, and preferably is, but is not limited to, about 2 about 5, about 8, about 10, about 25, about 50, about 75, about 100, about 250, about 500, about 750, about 1000, about 1500, about 2000, about 2500, about 3000, about 3500, about 4000, about 4500, about 5000 mg/L, or any concentration between about 2 mg/L to about 5000 mg/L, but is not limited to an integer concentration, such as about 63.33 mg/L, about 724.49 mg/L, and about 3852.31 mg/L. In some embodiments, the concentration of GABA in the ready-to-use composition is about 10 mg/L, or about 100 mg/L, or about 250 mg/L, or about 500 mg/L, or about 600 mg/L, or about 750 mg/L, or about 1000 mg/L.

In some embodiments, the composition for promoting the growth of legumes of the present invention may include one or more adjuvant. In other embodiments, the composition for promoting the growth of legumes of the present invention may not include an adjuvant. For example, the composition for promoting the growth of legumes may include a surfactant and/or a drift control agent. Exemplary surfactants include, but are not limited to, cationic surfactants, anionic surfactants, zwitterionic surfactants, and nonionic surfactants, preferably including but not limited to, Tween® 20, Tween® 40, Tween® 60, Tween® 65, Tween® 80, Tween® 85, Laureth-4, Ceteth-2, Ceteth-20, Steareth-2, PEG40, PEG100, PEG150, PEG200, PEG600, Span® 20, Span® 40, Span® 60, Span® 65, Span® 80. An exemplary drift control agent includes LI 700®, which is commercially available from Loveland Products (Loveland, CO, USA).

In some embodiments, the concentration of the adjuvant in the ready-to-use composition for promoting the growth of legumes is between about 0.01 to 1% (v/v), and preferably is, but is not limited to, about 0.01, about 0.02, about 0.03, about 0.04, about 0.05, about 0.06, about 0.0.7, about 0.08, about 0.09, about 0.1, about 0.2, about 0.3, about 0.4, about 0.5, about 0.6, about 0.7, about 0.8, about 0.9, about 1% (v/v). In some embodiments, the concentration of the adjuvant in the ready-to-use composition for promoting the growth of legumes is about 0.1% (v/v).

The present invention also provides a method for promoting the growth of legumes, comprising a step of applying a use solution composition to a leguminous plant, and the use solution composition comprising between about 0.2 mg/L to about 500 mg/L auxin, between about 2 mg/L to about 5000 mg/L choline chloride, and between about 2 mg/L to about 5000 mg/L GABA.

In some embodiments, the method further comprises a step of mixing the use solution composition with an adjuvant before the step of applying the use solution composition to the leguminous plant. In some embodiments, the adjuvant is a surfactant. In some embodiments, the adjuvant is a drift control agent. In some embodiments, the adjuvant is a mixture of a surfactant and a drift control agent.

In some embodiments, the composition for promoting the growth of legumes of the present invention is applied to a leguminous plant during the vegetative phase. In some embodiments, the composition for promoting the growth of legumes of the present invention is applied to a leguminous plant during the reproductive phase.

In some embodiments, the composition for promoting the growth of legumes of the present invention is applied to plant foliage (for example, leaves, stems, flowers and/or fruits), for example as a foliar application or foliar spray. In some embodiments, the composition for promoting the growth of legumes of the present invention is applied to plant roots, such as by a soil application or soil drench. In some embodiments, the composition for promoting the growth of legumes of the present invention is applied to seeds, such as by a seed treatment, for example, by soaking the seeds in the composition in liquid form for an appropriate time.

The composition of the present invention increases possibility for *Rhizobium* forming symbiont with leguminous plants, promotes the development of root nodules, stabilizes the symbiotic between a leguminous plant and *Rhizobium*, and powers the nodule symbiont to produce more nitrogen to promote plant growth and grain yield. In some embodiments, the composition of the present invention promotes the growth of legumes by at least one of the methods selected from increasing the yield, increasing root dry weight, increasing nodule weight and/or number, increasing leaf area, increasing leaf fresh weight and/or dry weight, increasing nitrogen content in leaves, increasing soluble protein in leaves, increasing pod number, and increasing seed weight and/or number, as compared to untreated plants. The target of the composition for promoting the growth of legumes is not restricted to soil-born *Rhizobium* or additional rhizobial inoculants.

It has been found that when auxin, choline chloride, and GABA are combined in the composition of the present invention, the plant growth regulating actions of the respective components are increased synergistically, and the combination of the components exhibits a marked synergistic effect not seen when the components are used individually.

Unless otherwise defined, all technical and scientific terms used herein have the same meaning as commonly understood by one of ordinary skill in the art to which this invention pertains. In the case of conflict, the present document, including definitions will control.

As used herein, the term "auxin" refers to a class of plant growth regulators that promote stem elongation, inhibit growth of lateral buds, and therefore maintain apical dominance. Naturally occurring (endogenous) auxins are produced by apical meristem, such as stem tips and root tips. Auxin moves to the darker side of the plant, causing the cells there to grow longer than corresponding cells on the lighter side of the plant, and this produces a curving of the plant stem tip toward the light. Examples of auxin include, but are not limited to, indole-3-butyric acid (IBA), indole-3-acetic acid (IAA), 2-phenylacetic acid (PAA), indole-3-propionic acid (IPA), 1-naphthaleneacetic acid (NAA).

As used herein, the term "indole-3-butyric acid (IBA)" refers to an auxin having the formula of $C_{12}H_{13}NO_2$ and the following chemical structure:

As used herein, the term "choline chloride" refers to an organic compound having the formula of $((CH_3)_3N(Cl) CH_2CH_2OH)$ and the following chemical structure:

7                                                                  8

As used herein, the term "γ-aminobutyric acid (GABA)," also known as 4-aminobutanoic acid, refers to a non-protein amino acid having the formula of $C_4H_9NO_2$ and the following chemical structure:

As used herein, the term "promoting growth of root nodule" refers to that compared with untreated plants, the same kind of plants treated with the composition of the present invention have increased nodule numbers, and/or increased nodule biomass, and/or increased root biomass, so that the plants have increased plant yields, such as increased shoot biomass, and/or increased pod numbers, and/or increased pot weights, and/or increased soluble protein content.

As used herein, the term "glutamate synthase" (GOGAT), as known as glutamine oxoglutarate aminotransferase, refers to an enzyme that manufactures glutamate from glutamine and α-ketoglutarate. In nitrogen assimilation in plants, GOGAT, along with nitrate reductase (NR), nitrite reductase (NiR), and glutamine synthetase (GS), form organic nitrogen compounds, such as amino acids and proteins, from inorganic nitrogen compounds present in the environment, such as nitrate ($NO_3^-$) and nitrite ($NO_2^-$). Therefore, an increasing activity of GOGAT in plant cells indicates that the plant has increasing nitrogen assimilation, nitrogen absorption, and nitrogen fixation.

As used interchangeably herein, the term "leguminous plant" or "legume" refers to plants in the family Fabaceae (or Leguminosae), including plants in the subfamily Mimosoideae (such as white popinac leadtree and *Taiwan acacia*), plants in the subfamily Caesalpinioideae (such as golden phoenix tree and Chinese redbud), and plants in the subfamily Papilionoideae (or Faboideae) (such as soybeans, peas, cowpeas, chickpeas, peanuts, lupins, carob, tamarind, alfalfa, and clover). Most legumes' root system is colonized by symbiotic nitrogen-fixing bacteria, such as *Rhizobium* and *Bradyrhizobium*, which causes the roots to form nodules to house the bacteria.

As used herein, the term "surfactants" refers to molecules containing both lipophilic groups (the long-chain alkyl group) and hydrophilic groups, which allow oily substances to be dispersed or dissolved in water. The surfactants described herein include, but are not limited to, cationic surfactants, anionic surfactants, zwitterionic surfactants, and non-ionic surfactants, such as Tween® series, Laureth series, Ceteth series, Steareth series, PEG series, and Span® series.

As used herein, the terms "comprises," "comprising," "includes," "including," "has," "having," "contains," "containing," "characterized by" or any other variation thereof, are intended to cover a non-exclusive inclusion, subject to any limitation explicitly indicated. For example, a composition, mixture, process, method, article, or apparatus that comprises a list of elements is not necessarily limited to only those elements but may include other elements not expressly listed or inherent to such composition, mixture, process, method, article, or apparatus.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where applicants have defined an invention or a portion thereof with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The term "a," "an," or "the" disclosed in the present invention is intended to cover one or more numerical values in the specification and claims unless otherwise specified. For example, "an element" indicates one or more than one element.

It is to be understood that both the foregoing general description and the following detailed description are exemplary and explanatory only and are not restrictive of the invention.

EXAMPLES

Example 1 Efficacy Test on Soybean Plants

1. Preparation and Treatment of Test Plants

Soybean seeds (Kaohsiung 9, Kaohsiung District Agricultural Research and Extension Station, Kaohsiung, Taiwan) were soaked in the reagents listed in Table 1 and then were sown in soil of an open field. At V2 stage (two sets of unfolded trifoliate leaves), soybean plants were applied with the reagents listed in Table 1 once using a foliar spray treatment. Therefore, the reagents listed in Table 1 were applied to the test plants twice in total during the test period.

TABLE 1

| | | Summary of the reagents applied to plants in Examples 1 and 2 | | |
|---|---|---|---|---|
| Group | IBA (mg/L) | Choline Chloride (mg/L) | GABA(mg/L) | Tween ® 80, % (v/v) |
| Control | 0 | 0 | 0 | 0.1 |
| Test | 75 | 300 | 600 | 0.1 |

2. Analyses (i) Nodule Number and Weights

Twenty-five (25) days after sowing, soybean plants at R1 stage (beginning flowering) were randomly selected. Nodules from 10 soybean plants were collected for counting number. Nodules from 5 soybean plants were collected for measuring their dry weights.

(ii) Analyses of Plant Growth

Phenotype observation: Fifty-three (53) days after sowing, soybean plants at R5 stage (beginning seed) were randomly selected for phenotype observation.

Shoot Dry Weight: Soybean shoots, including leaves and stems but not including pods, were collected before the foliar spray treatment (at V2 stage), 25 days after sowing (at R1 stage), and 53 days after sowing (at R5 stage), respectively. The collected samples were dried at 50° C. overnight, and then the dry weight was measured.

Leaflet Length: The first trifoliate was collected before the foliar spray treatment (at V2 stage), and the fifth trifoliate was collected 25 days after sowing (at R1 stage). Length of the terminal leaflets of the trifoliate was measured.

(iii) Protein Content

Five (5) soybean plants were randomly selected on the 53rd day (Day 53) after sowing (at R5 stage). The third trifoliate from the top of the plants were collected for analyses of protein content.

Soluble Protein Content: One hundred (100) mg of fresh sample leaf was ground with about 1 ml of extraction solution containing 50 mM phosphate buffered saline (PBS, pH6.8) and 1% (v/v) sodium dodecyl sulfate (SDS) to extract soluble protein. The extraction was then centrifuged at 4° C., 12,000×g for 15 minutes, and the supernatant was collected and stored at 4° C. One (1) μl of the supernatant was mixed with 49 μl of 50 mM PBS (pH6.8) and 200 μl of Bradford reagent, and absorbance at an O.D. of 595 nm ($A_{595}$) of the mixture was measured. Concentration of soluble protein in a sample was calculated from a bovine serum albumin (BSA) standard curve. Each group had 3 replicates.

Total Amount of Soluble Protein: The total amount of soluble protein in the leaves of a whole soybean plant (mg/plant) was calculated by multiplying the soluble protein content of the leaves (mg/g fresh weight of leaves) by the fresh weight of the total leaves of the soybean plant (g/plant).

Nitrogen Content: The total leaves of a soybean plant were collected, air-dried at 50° C. overnight and then ground into powder. Six (6) to 8 mg sample powder was analyzed with Thermo Scientific FLASH 2000 Elemental Analyzer (Thermo Fisher Scientific, Waltham, MA, USA) for nitrogen content ratio (%).

Crude Protein Content: The crude protein content (%) of leaves was calculated by multiplying the nitrogen content (%) by 6.25 (protein conversion factor).

Total Amount of Crude Protein: The total amount of crude protein in the leaves of a whole soybean plant (g/plant) was calculate by multiplying the crude protein content (%) by the dry weight of the total leaves of the soybean plant (g/plant).

(iv) Yield

Soybean yield was estimated at the 13th week (Week 13) after sowing (R8 stage, full maturity), including pod number, seed number, seed dry weight, and the total amount of crude protein in the seeds. Ten (10) plants in each group were randomly selected for pod number and seed number. Each test had 3 biological replicates. Nitrogen content of seeds, crude protein content and the total amount of crude protein of seeds were measured and calculated as described in section (iii), in which leaves were replaced by seeds.

(v) Statistics

Average and standard deviation (SD) of each group were calculated. Statistically significant differences between control group and test groups were assessed by Student's t-test, where p-value<0.05 was considered a significant difference and indicated by an asterisk (*).

3. Results

The composition of the present invention increases nodule number and nodule dry weight of soybean plants. As shown in FIG. 1A, soybean plants treated with the composition of the present invention (the test group) had 38% more nodule number than the control group. In addition, as shown in FIG. 1B, soybean plants in the test group had a significant increase in nodule dry weight by 191% (p<0.01), as compared with the control group.

Figure 2:
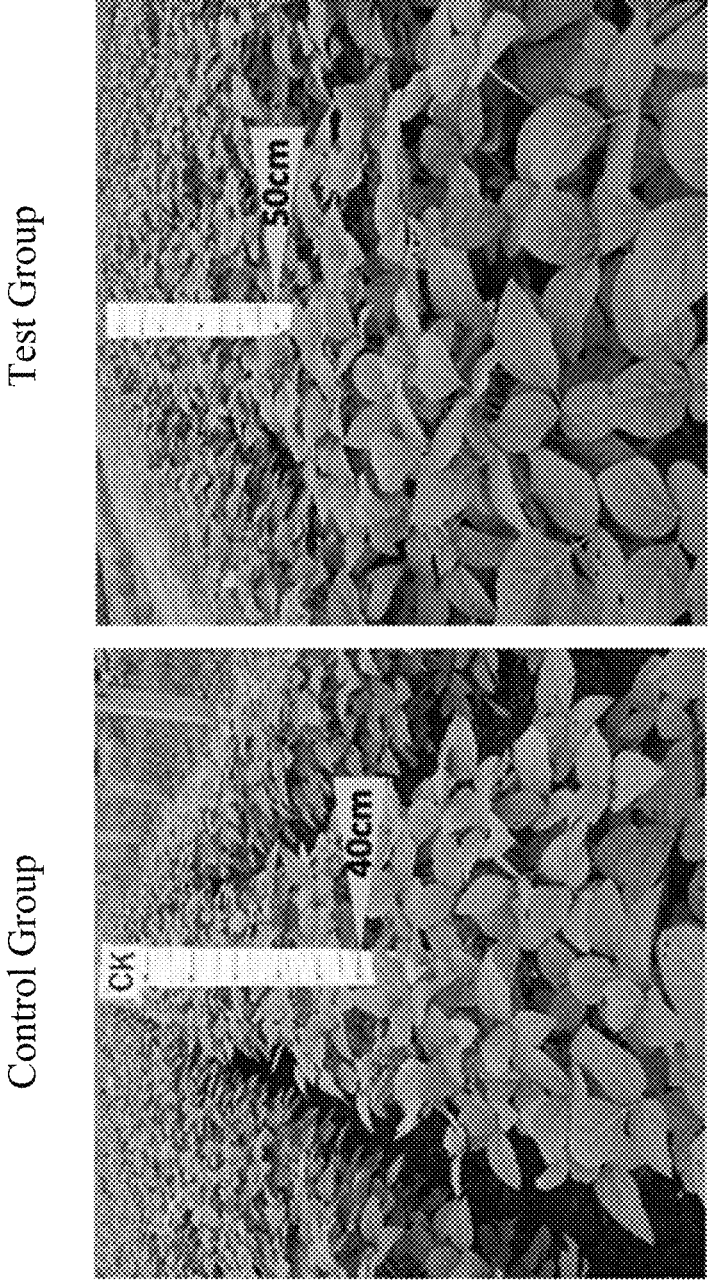
FIG. 2 shows phenotype observation of soybean plants on Day 53 after sowing (R5 stage, beginning seed) in Example 1. Left panel: Control group; right panel: Test group.

The composition of the present invention promotes the growth of soybean plants. As shown in FIG. 2, on Day 53 after sowing (R5 stage), soybean plants in the test group were taller, with greener leaves and larger leaf area than the control group. In addition, as shown in Table 2, compared with the control group, the shoot dry weight (without pods) of soybean plants in the test group was significantly increased by 32%, 57%, and 35% at V2, R1, and R5 stages, respectively (p<0.05 or p<0.001). Furthermore, as shown in Table 3, compared with the control group, soybean plants in the test group had longer leaflet length; particularly, the leaflet length of the 5th trifoliate at R1 stage was significantly longer than that of the control group (p<0.01). The results indicate that soybean plants treated with the composition of the present invention exhibited better shoot growth than the control group.

TABLE 2

| | Average shoot dry weight (without pods) per plant in Example 1 | | |
|---|---|---|---|
| Growth Stage | Control group (g) | Test group (g) | Increase rate# (%) |
| V2 stage | 0.28 | 0.37* | +32% |
| R1 stage | 2.64 | 4.14* | +57% |
| R5 stage | 7.56 | 10.22*** | +35% |

Increase rate refers to the percentage increase in the shoot dry weight of the test group compared to that of the control group.
*p < 0.05;
***p < 0.001.

TABLE 3

| | Average leaflet length of the first trifoliate (at V2 stage) and the fifth trifoliate (at R1 stage) of soybean plants in Example 1 | |
|---|---|---|
| Growth Stage | Control group (cm) | Test group (cm) |
| V2 stage | 5.46 | 5.81 |
| R1 stage | 11.55 | 12.08** |

**p < 0.01.

The composition of the present invention increases protein content of soybean leaves. As shown in Table 4, on Day 53 after sowing (R5 stage), soybean plants in the test group had a significant increase in the soluble protein content of leaves by 27% (p<0.01) and an increase in total amount of soluble protein and total amount of crude protein by 79% and 35%, respectively, as compared with the control group. The results indicate that the composition of the present invention promotes nitrogen uptake and use efficiency by soybean plants, thereby producing more protein, resulting in an increase in total amount of crude protein and soluble protein.

TABLE 4

Protein content of soybean leaves
on Day 53 (R5 stage) in Example 1

| | Control group | Test group | Increase rate[#] (%) |
|---|---|---|---|
| Soluble protein content of leaves (mg/g of leaf fresh weight) | 115.9 | 147.1** | +27% |
| Total amount of soluble protein (mg/plant) | 1773.0 | 3167.0 | +79% |
| Crude protein content of leaves (% of leaf dry weight) | 25.6 | 25.1 | — |
| Total amount of crude protein (g/plant) | 98.0 | 132.5 | +35% |

[#]Increase rate refers to the percentage increase in the test group compared to the control group.
**p < 0.01.

Figure 3:
FIG. 3 shows phenotype observation of soybean leaves and pods on Day 53 after sowing (R5 stage, beginning seed) in Example 1. Left panel: Control group; right panel: Test group.
Figure 3:
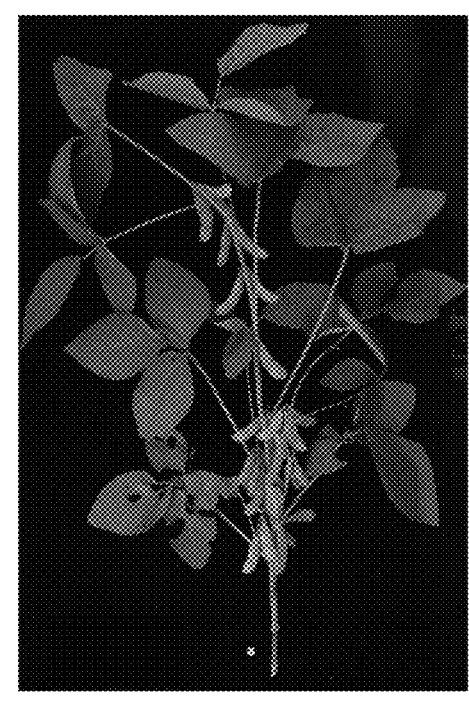
Figure 4:
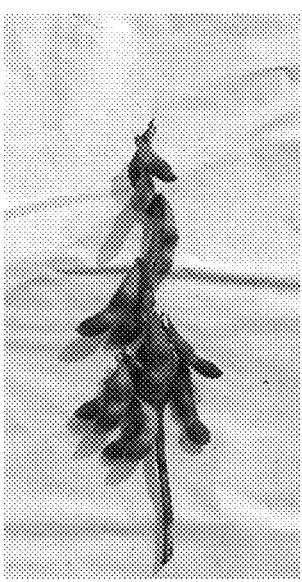
FIG. 4 shows phenotype observation of soybean pods at Week 13 after sowing (R8 stage, full maturity) in Example 1. Left panel: Control group; right panel: Test group.
Figure 4:

The composition of the present invention increases soybean yield. FIG. 3 and FIG. 4 show the soybean pods on Day 53 (R5 stage) and at Week 13 (R8 stage) after sowing, respectively. As shown in FIGS. 3 and 4, compared to the control group, soybean plants in the test group had more and larger pods at both R5 and R8 stages. In addition, as shown in Table 5, soybean plants in the test group had a significant increase in pod number and seed number by 35% (p<0.05) and 37% (p<0.05), respectively, as compared with the control group. Soybean plants in the test group also had higher seed dry weight and see protein content than that of the control group. The results indicate that the composition of the present invention increases soybean yield.

TABLE 5

Soybean yield at Week 13 after sowing in Example 1

| | Pod Number (/plant) | | Seed Number (/plant) | | Seed Dry Weight (g/plant) | | Seed Protein Content (g/plant) | |
|---|---|---|---|---|---|---|---|---|
| Group | Mean | Incr. rate[#] | Mean | Incr. rate[#] | Mean | Incr. rate[#] | Mean | Incr. rate[#] |
| Control | 15.4 | — | 30.0 | — | 12.47 | — | 4.15 | — |
| Test | 20.8* | +35% | 41.2* | +37% | 17.22 | +38% | 5.14 | +30% |

[#]Increase rate refers to the percentage increase in the test group compared to the control group.
*p < 0.05.

To sum up, the composition of the present invention promotes the growth of nodules of soybean plants, resulting in more nodules and nodule weight, thereby increasing the nitrogen absorption and nitrogen use efficiency of soybean plants, promoting soybean plant growth and increasing soybean yield.

Example 2 Efficacy Test on Alfalfa

1. Preparation and Treatment of Test Plants

Sowing: Alfalfa (Medicago sativa L.) seeds were sown in 3.5-inch pots containing culture medium (peat soil:vermiculite=1:1). Five (5) seeds were sown in one pot.

Rhizobium Inoculation: Rhizobium (Ensifer meliloti) with an $OD_{600}$ of approximately 0.7 was diluted 1:1000 with water, and the diluted inoculum was applied once to alfalfa by soil watering at the time of sowing. After inoculation, the pots were placed in a phytotron, which was operated at 25/23° C. day/night temperature and on a 16/8 h light/dark cycle.

Reagent Treatment: Two (2) weeks after sowing (V2 stage), alfalfa plants were applied with the reagents listed in Table 1 once at a rate of 10 mL/12 pots using a foliar spray treatment. The reagents were applied once in total during the test period.

2. Analyses (i) Root Dry Weight

Seven (7) days after the application of reagents, 10 alfalfa plants from each group (N=10) were randomly selected. The collected samples were dried at 50° C. overnight, and then the root dry weight was measured. Each test was repeated twice, and 5 biological replicates were performed for each test.

(ii) Nodule Weights

Seven (7) days after the application of reagents, 10 alfalfa plants from each group (N=10) were randomly selected. Nodules from the 10 alfalfa plants were collected and dried at 50° C. overnight, and then the dry weight of the nodules was measured. Each test was repeated twice, and 5 biological replicates were performed for each test.

(iii) Leaf Area

Seven (7) days after the application of reagents, 10 alfalfa plants from each group (N=10) were randomly selected. The leaf area of the fourth trifoliate leaf of each alfalfa plant was measured by a leaf analyzer (WinFOLIA™ Pro LA2400, Regent Instruments Inc., Québec, Canada). Each test was repeated twice.

(iv) Shoot Dry Weight

Seven (7) days after the application of reagents, 10 alfalfa plants from each group (N=10) were randomly selected. The collected samples were dried at 50° C. overnight, and then the shoot dry weight was measured. Each test was repeated twice, and 5 biological replicates were performed for each test.

(v) Statistics

Average and standard deviation (SD) of each group were calculated. Statistically significant differences between control group and test groups were assessed by Student's t-test, where p-value<0.05 was considered a significant difference and indicated by an asterisk (*). Two asterisks (**) are used to indicate p-value<0.01.

3. Results

Figure 5:
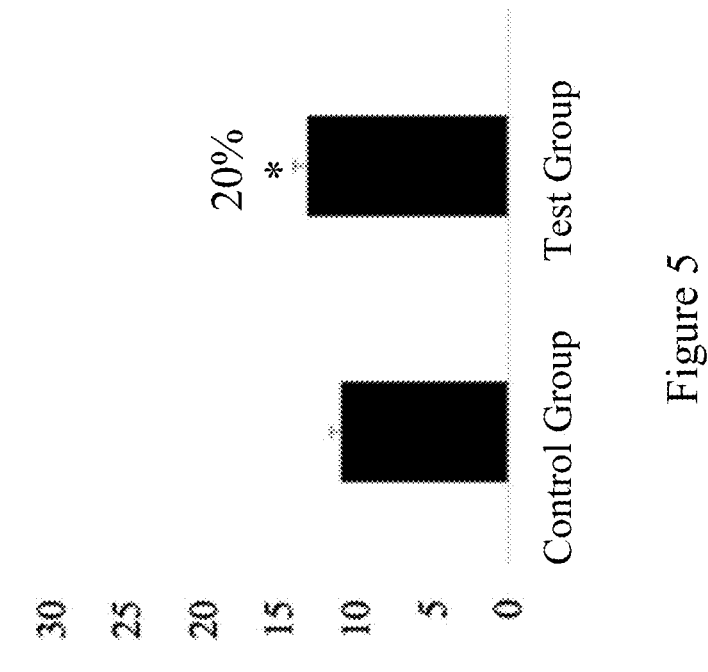
FIG. 5 shows the average root dry weight per alfalfa plant on Day 7 after applied with the test reagent in Example 2. The number above the bar of the Test group indicates the percentage increase compared to the control group. *$p<0.05$.

The composition of the present invention increases root dry weight of alfalfa plants. As shown in FIG. 5, on Day 7 after the application of the reagents (V4 stage), alfalfa plants treated with the composition of the present invention (test group) had a significant increase in root dry weight by 20% (p<0.05), as compared with the control group.

Figure 6:
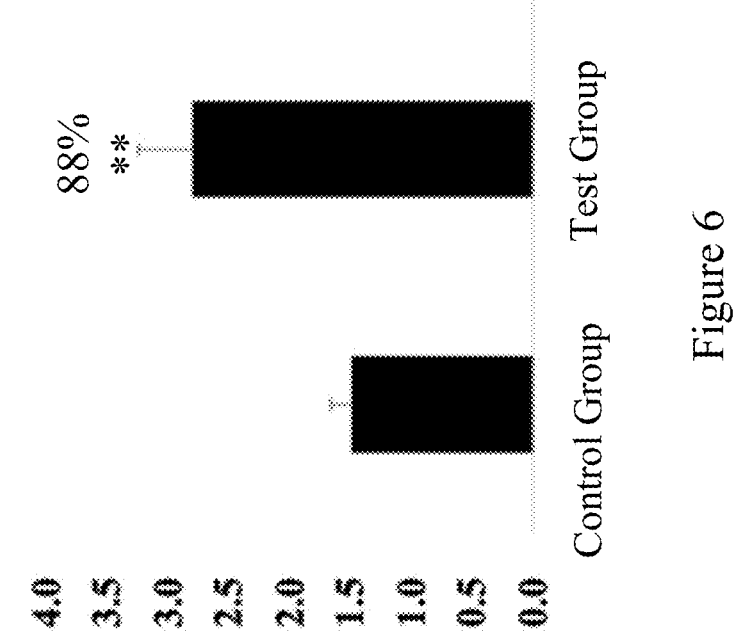
FIG. 6 shows the average nodule dry weight per alfalfa plant on Day 7 after applied with the test reagent in Example 2. The number above the bar of the Test group indicates the percentage increase compared to the control group. **$p<0.01$.

The composition of the present invention increases nodule dry weight of alfalfa plants. As shown in FIG. 6, on Day 7 after the application of the reagents (V4 stage), alfalfa plants in the test group had a significant increase in nodule dry weight by 88% (p<0.01), as compared with the control group.

Figure 7:
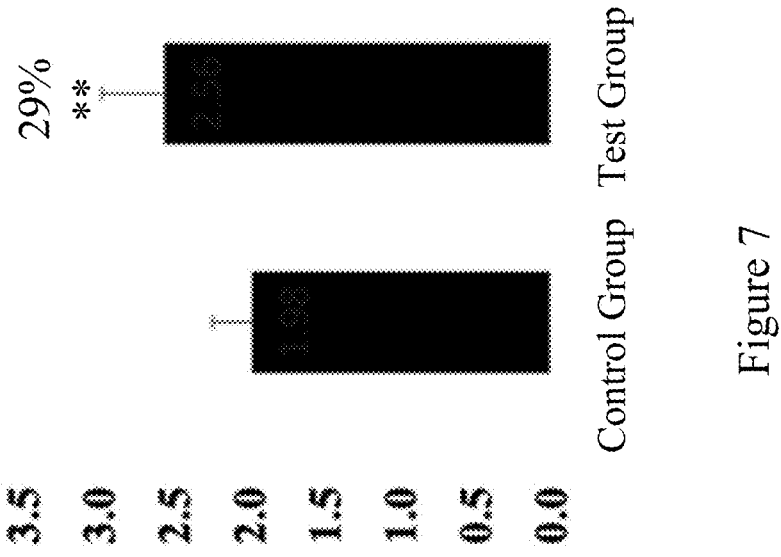
FIG. 7 shows the average leaf area of the fourth trifoliate leaf of alfalfa on Day 7 after applied with the test reagent in Example 2. The number above the bar of the Test group indicates the percentage increase compared to the control group. **$p<0.01$.

The composition of the present invention increases leaf area of alfalfa plants. As shown in FIG. 7, on Day 7 after the application of the reagents (V4 stage), alfalfa plants in the test group had a significant increase in leaf area by 29% (p<0.01), as compared with the control group.

Figure 8:
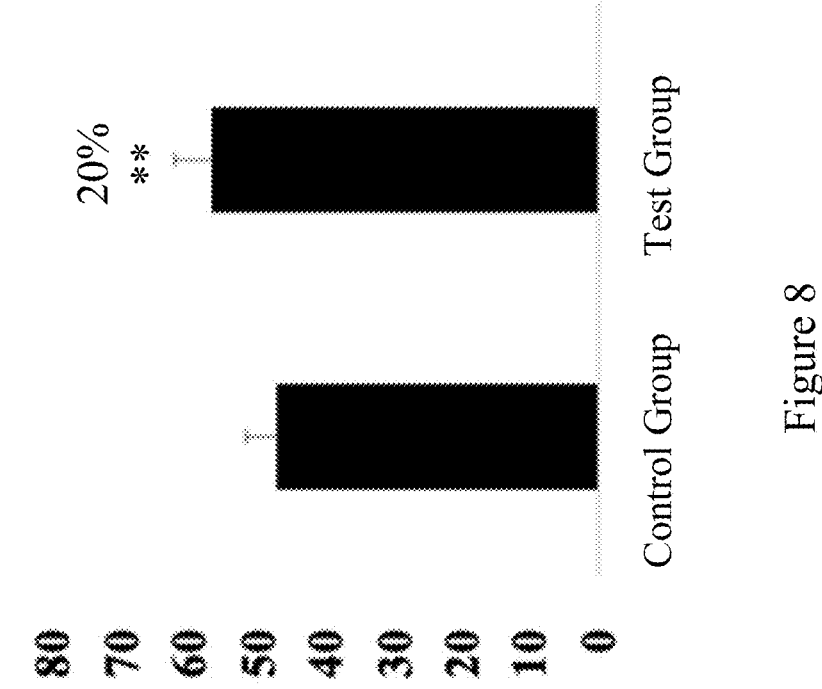
FIG. 8 shows the average shoot dry weight per alfalfa plant on Day 7 after applied with the test reagent in Example 2. The number above the bar of the Test group indicates the percentage increase compared to the control group. **$p<0.01$.

The composition of the present invention increases shoot dry weight of alfalfa plants. As shown in FIG. 8, on Day 7 after the application of the reagents (V4 stage), alfalfa plants in the test group had a significant increase in shoot dry weight by 20% (p<0.01), as compared with the control group.

To sum up, these results indicate that the composition of the present invention promotes the growth of nodules of alfalfa plants, resulting in higher nodule dry weight, thereby promoting alfalfa plant growth, including root and shoot growth.

Example 3 Efficacy Test on Alfalfa with or without *Rhizobium* Inoculation

1. Preparation and Treatment of Test Plants

Alfalfa (*Medicago sativa* L.) seeds were sown in 3.5-inch pots containing culture medium (peat soil:vermiculite=1:1). Five (5) seeds were sown in one pot. Alfalfa plants were randomly divided into 6 groups, in which Groups 1 to 3 were not inoculated with *Rhizobium*, and Groups 4 to 6 were inoculated with *Rhizobium*. *Rhizobium* inoculation was the same as described in Example 2. After inoculation, the pots were placed in a phytotron, which was operated at 25/23° C. day/night temperature and on a 16/8 h light/dark cycle. Two (2) weeks after sowing (V2 stage), alfalfa plants were applied with the reagents listed in Table 6 once at a rate of 10 mL/12 pots using a foliar spray treatment. The reagents were applied once in total during the test period.

TABLE 6

Summary of the reagents applied to plants in Example 3

| Group | IBA (mg/L) | Choline Chloride (mg/L) | GABA (mg/L) | Tween ® 80, % (v/v) | Rhizobium Inoculation |
|---|---|---|---|---|---|
| Group 1 | 0 | 0 | 0 | 0.1 | − |
| Group 2 | 15 | 200 | 100 | 0.1 | − |
| Group 3 | 100 | 1000 | 1000 | 0.1 | − |
| Group 4 | 0 | 0 | 0 | 0.1 | + |
| Group 5 | 15 | 200 | 100 | 0.1 | + |
| Group 6 | 100 | 1000 | 1000 | 0.1 | + |

2. Analyses (i) Shoot Weight

Twelve (12) days after the application of reagents, 12 alfalfa plants from each group (N=12) were randomly selected for phenotype observation, and the shoot fresh weight of the collected samples was measured. Then, the collected samples were dried at 50° C. overnight, and the shoot dry weight was measured.

(ii) Leaf Area

Twelve (12) days after the application of reagents, 6 alfalfa plants from each group (N=6) were randomly selected. All the trifoliate leaves of the selected plants were collected and numbered in sequence from bottom to top. The leaf area of all the trifoliate leaves of each alfalfa plant was measured by a leaf analyzer (WinFOLIA™ Pro LA2400, Regent Instruments Inc.).

(iii) Root Dry Weight

Twelve (12) days after the application of reagents, 4 alfalfa plants from each group (N=4) were randomly selected. The collected samples were dried at 50° C. overnight, and then the root dry weight was measured.

(iv) Nitrogen Content

Twelve (12) days after the application of reagents, 4 alfalfa plants from each group (N=4) were randomly selected. The first to fifth trifoliate leaves of the selected plants were collected, air-dried at 50° C. overnight and then ground into powder. Six (6) to 8 mg sample powder was analyzed with Thermo Scientific FLASH 2000 Elemental Analyzer (Thermo Fisher Scientific) for nitrogen content ratio (%).

(v) Activity of Glutamate Synthase (GOGAT)

Twelve (12) days after the application of reagents, 4 alfalfa plants from each group (N=4) were randomly selected. The third trifoliate leaves of the selected plants were collected to determine GOGAT activity by the following method. Zero-point-five (0.5) gram of fresh sample leaf was ground in liquid nitrogen. The leaf powder and 1 ml of extraction solution, containing 10 mM Tris-HCl (pH7.6), 1 mM $MgCl_2$, 1 mM EDTA, and 10 mM 2-Mercaptoethanol, were centrifuged at 4° C., 13,000 rcf for 30 minutes. Zero-point-one-five (0.15) ml of the supernatant was mixed with the reaction solution containing 0.2 mL of 20 mM L-glutamine, 0.25 mL of 2 mM 2-oxoglutarate, 0.05 mL of 10 mM KCl, 1 mL of 25 mM Tris-HCl (pH7.6), and 0.1 mL 3 mM NADH to initiate the reaction. The GOGAT activity is determined by NADH reduction through measuring fluorescence intensity at excitation/emission wavelengths of 340/445 nm. One (1) unit of GOGAT activity was defined as the amount of enzyme causing oxidation of 1 μmol of NADH in 1 minute. The total GOGAT activity was defined as the amount of NADH oxidized in 1 gram of fresh weight sample in 1 minute, and expressed as μmole NADH oxidized·$min^{-1}$·$g^{-1}$FW.

(vi) Statistics

Average and standard error (SE) of each group were calculated. Statistically significant differences between control group and test groups were assessed by Student's t-test, where p-value<0.05 was considered a significant difference and indicated by asterisks (*p<0.05, p<0.01 and *p<0.001).

3. Results

Figure 9A:
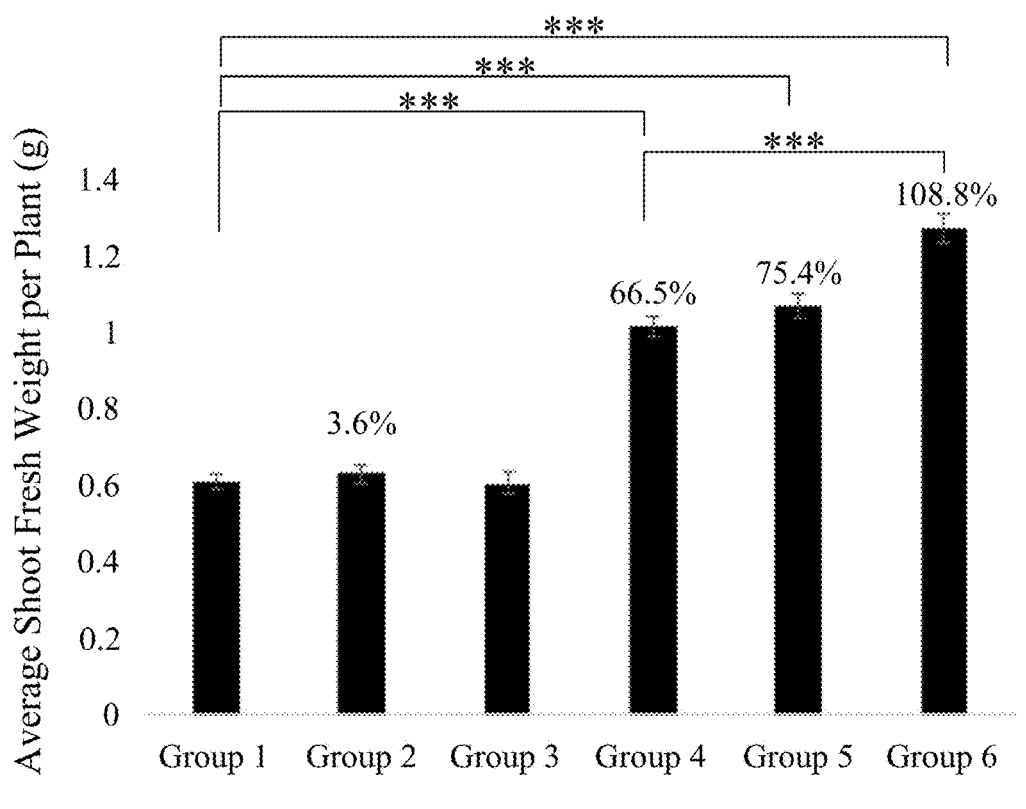
FIG. 9A shows the average shoot fresh weight per alfalfa plant on Day 12 after applied with the test reagents in Example 3 (N=12).
Figure 9B:
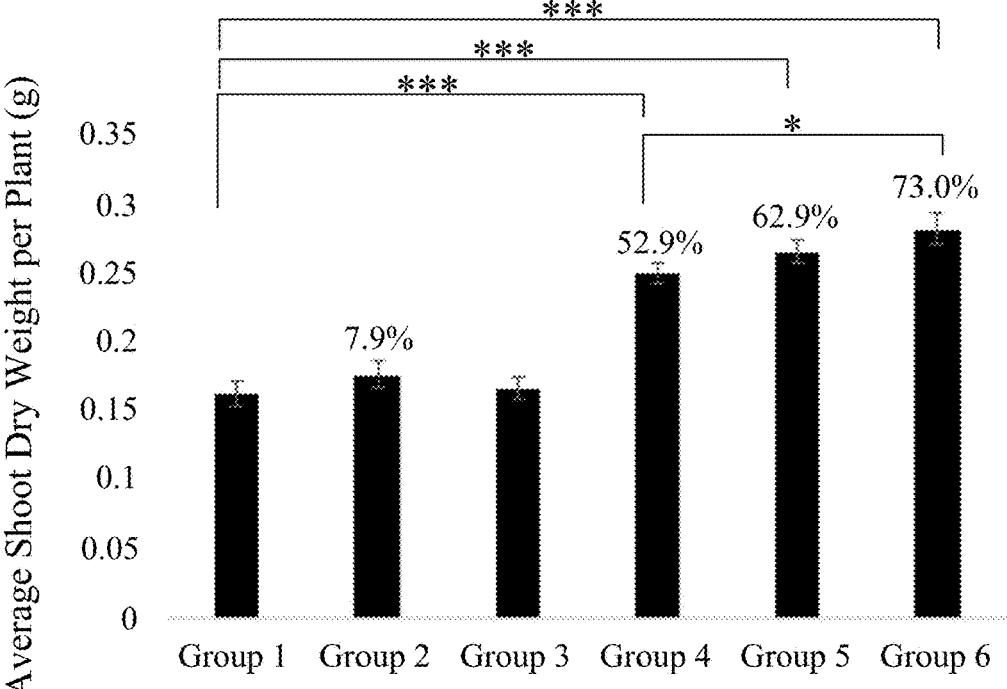
FIG. 9B shows the average shoot dry weight per alfalfa plant on Day 12 after applied with the test reagents in Example 3 (N=12). The numbers above the bars of Groups 2, 4, 5, 6 indicate the percentage increase compared to Group 1 (the control group). *$p<0.05$; ***$p<0.001$.
Figure 10:
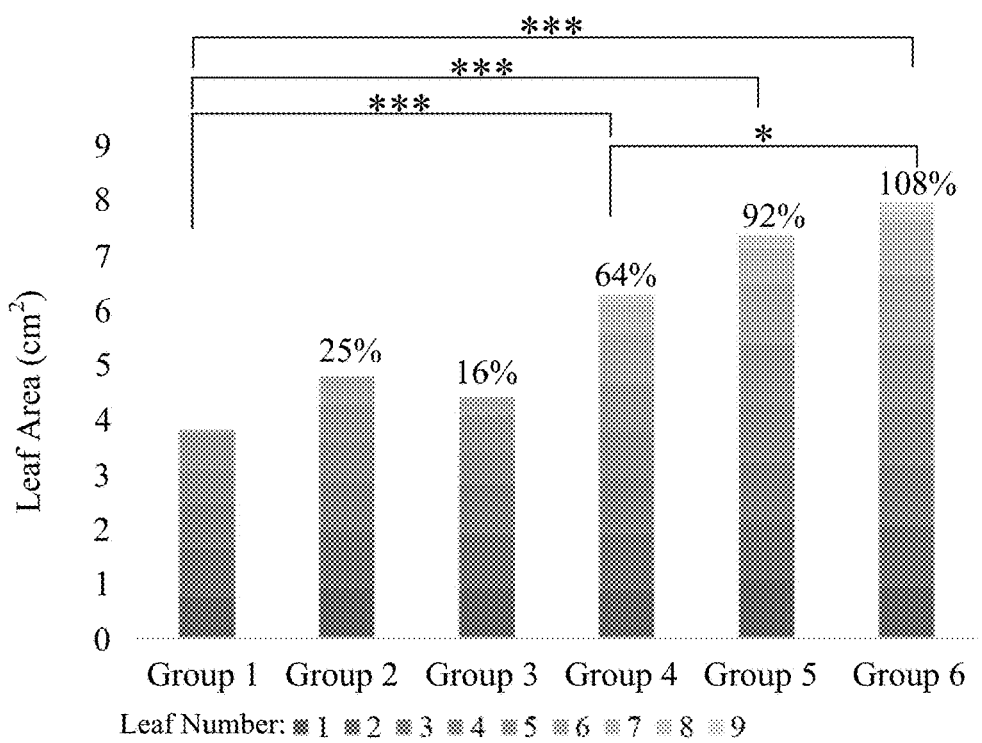
FIG. 10 shows the average leaf area of trifoliate leaves per alfalfa plant on Day 12 after applied with the test reagents in Example 3 (N=6). The numbers above the bars of Groups 2 to 6 indicate the percentage increase compared to Group 1 (the control group). *$p<0.05$; ***$p<0.001$.
Figure 11:
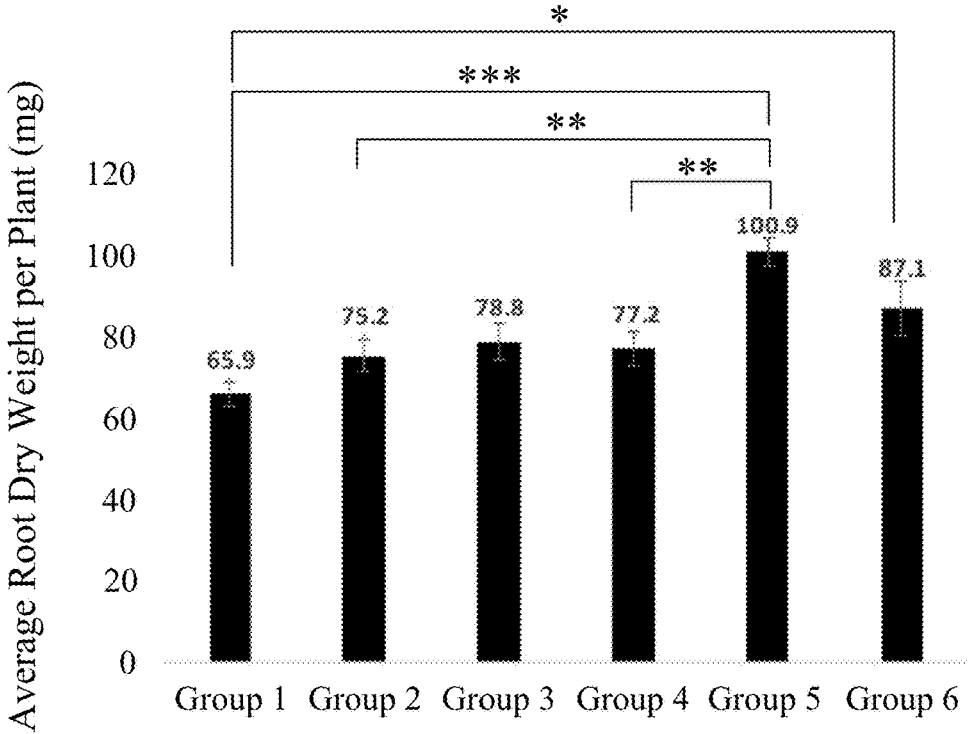
FIG. 11 shows the average root dry weight per alfalfa plant on Day 12 after applied with the test reagents in Example 3 (N=4). The numbers above the bars indicate the average root dry weight. *$p<0.05$; $p<0.01$; *$p<0.001$.
Figure 12:
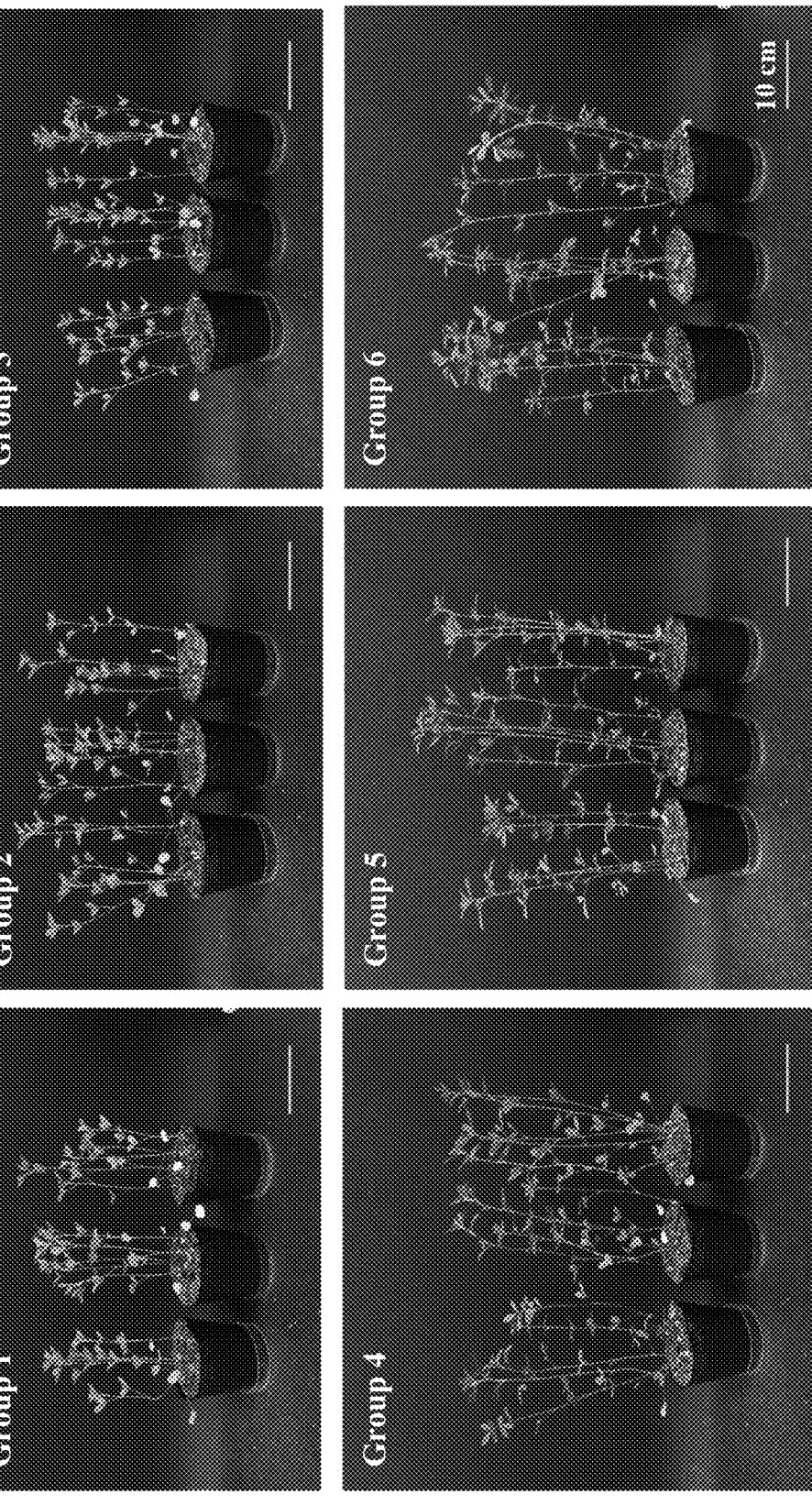
FIG. 12 shows phenotype observation of alfalfa plants on Day 12 after applied with the test reagents in Example 3. Scale bar: 10 cm.

The composition of the present invention promotes the growth of alfalfa plants, especially alfalfa plants inoculated with *Rhizobium*. As compared with the alfalfa plants with neither inoculation of *Rhizobium* nor application of the composition of the present invention (Group 1), the alfalfa plants without inoculation of *Rhizobium* but applied with the compositions of the present invention (Groups 2 and 3) had slightly higher shoot fresh weights and shoot dry weights (FIGS. 9A and 9B), bigger leaf areas (FIG. 10 and Table 7, with an increase of 1625%), and slightly higher root dry weights (FIG. 11). In addition, as compared with the alfalfa plants of Group 1, the alfalfa plants with only inoculation of *Rhizobium* (Group 4) and the alfalfa plants with both inoculation of *Rhizobium* and application of the composition of the present invention (Groups 5 and 6) were higher (FIG. 12) and had significantly higher shoot fresh weights and shoot dry weights (FIGS. 9A and 9B, with an increase of shoot fresh weight of 66.5%, 75.4%, 108.8% and an increase of shoot dry weight of 52.9%, 62.9%, 73.0% for Groups 4, 5, and 6, respectively; p<0.001), significantly bigger leaf areas and higher leaf numbers (FIG. 10 and Table 7, with an increase of leaf area of 64%, 92%, 108% and an increase of 2, 2, 3 trifoliate leaves for Groups 4, 5, and 6, respectively; p<0.001), and higher root dry weights (FIG. 11, Groups 5 and 6 were significantly higher than Group 1, p<0.001 or p<0.05). Furthermore, as compared with the alfalfa plants of Group 4, the alfalfa plants of Groups 5 and 6 were higher (FIG. 12) and had higher shoot fresh weights and shoot dry weights (FIGS. 9A and 9B, Group 6 was significantly higher than Group 4, p<0.001 or p<0.05), bigger leaf areas (FIG. 10 and Table 7, Group 6 had a significantly bigger leaf area and higher leaf number than Group 4, p<0.05), and higher root dry weights (FIG. 11, Group 5 was significantly higher than Group 4, p<0.01). These results indicate that in the absence of *Rhizobium*, the composition of the present invention slightly promotes the growth of alfalfa plants, while in the presence of *Rhizobium*, the composition of the present invention significantly promotes the growth of alfalfa plants, with a better effect than inoculation of *Rhizobium* only.

TABLE 7

Summary of leaf areas and leaf numbers
of the alfalfa plants in Example 3

| Number of Trifoliate | Leaf Area (cm²/plant) | | | | | |
|---|---|---|---|---|---|---|
| Leaves | Group 1 | Group 2 | Group 3 | Group 4 | Group 5 | Group 6 |
| 1 | 0.81 | 0.94 | 0.93 | 0.90 | 1.05 | 0.97 |
| 2 | 0.87 | 1.03 | 1.00 | 1.03 | 1.11 | 1.08 |
| 3 | 0.79 | 0.93 | 0.88 | 1.01 | 1.09 | 1.12 |
| 4 | 0.66 | 0.72 | 0.65 | 0.85 | 1.04 | 1.06 |
| 5 | 0.62 | 0.62 | 0.63 | 0.87 | 1.13 | 1.20 |
| 6 | 0.09 | 0.55 | 0.34 | 0.93 | 1.07 | 1.25 |
| 7 | 0.00 | 0.00 | 0.00 | 0.52 | 0.63 | 0.94 |
| 8 | 0.00 | 0.00 | 0.00 | 0.17 | 0.23 | 0.19 |
| 9 | 0.00 | 0.00 | 0.00 | 0.00 | 0.00 | 0.14 |
| Sum | 3.82 | 4.78 | 4.42 | 6.27 | 7.35 | 7.94 |

Figure 13:
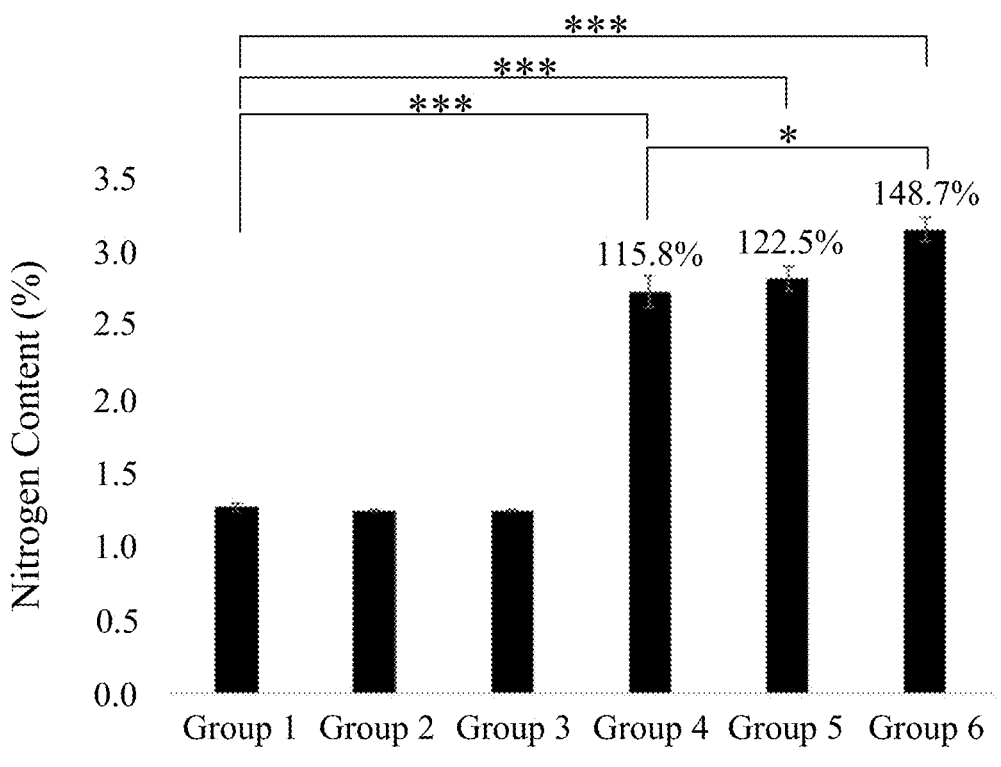
FIG. 13 shows the nitrogen content of alfalfa leaves on Day 12 after applied with the test reagents in Example 3 (N=4). The numbers above the bars of Groups 4 to 6 indicate the percentage increase compared to Group 1 (the control group). *$p<0.05$; ***$p<0.001$.

The composition of the present invention increases nitrogen content of alfalfa plants inoculated with *Rhizobium*. As shown in FIG. 13, 12 days after the application of reagents, the alfalfa plants of Groups 4 to 6 had significantly higher nitrogen content in the leaves than the alfalfa plants of Group 1 (p<0.001), with an increase of 115.8%, 122.5%, and 148.7%, respectively. In addition, as compared with the alfalfa plants of Group 4, the alfalfa plants of Groups 5 and 6 had higher nitrogen content in the leaves, in which Group 6 was significantly higher than Group 4 (p<0.05). These results indicate that in the presence of *Rhizobium*, the composition of the present invention significantly increases nitrogen content in the leaves of alfalfa plants, with a better effect than inoculation of *Rhizobium* only.

Figure 14:
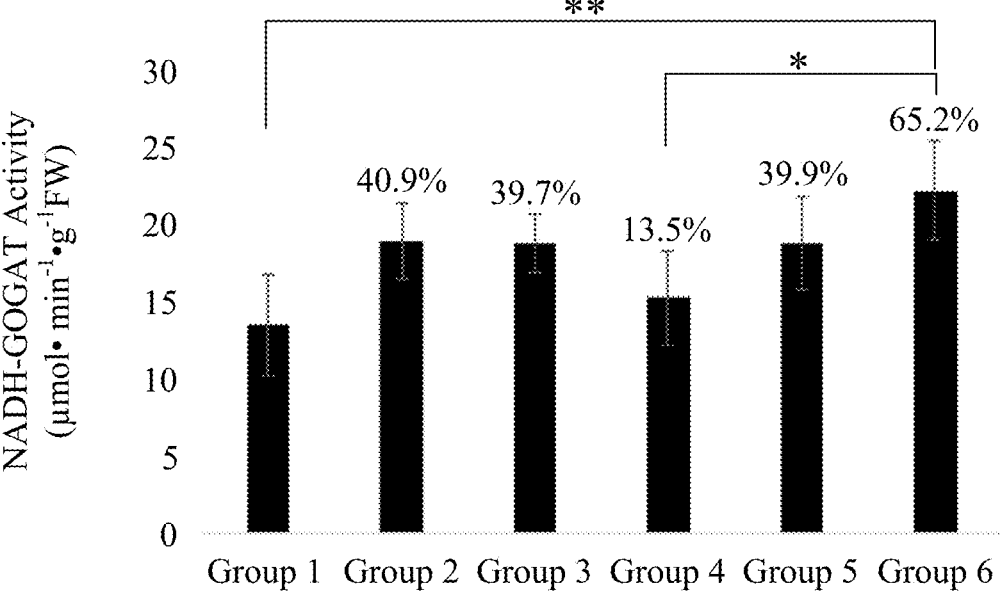
FIG. 14 shows activities of glutamate synthase (GOGAT) of alfalfa leaves on Day 12 after applied with the test reagents in Example 3 (N=4). The numbers above the bars of Groups 2 to 6 indicate the percentage increase compared to Group 1 (the control group). *$p<0.05$; **$p<0.01$.

The composition of the present invention increases GOGAT activity in the leaves of alfalfa plants. As shown in FIG. 14, 12 days after the application of reagents, the alfalfa plants of Groups 2 to 6 had higher GOGAT activity in the leaves than the alfalfa plants of Group 1, with an increase of 40.9%, 39.7%, 13.5%, 39.9%, and 65.2%, respectively. In particular, Group 6 had significantly higher GOGAT activity than both Groups 1 and 4 (p<0.01 or p<0.05). These results show that with or without the presence of *Rhizobium*, the composition of the present invention increases GOGAT activity in the leaves of alfalfa plants, indicating increased nitrogen assimilation ability and improved nitrogen fixation capacity of the plant.

However, although the composition of the present invention increases GOGAT activity (FIG. 14, Groups 2 and 3), due to the role of *Rhizobium* as the nitrogen provider, in the absence of *Rhizobium*, the nitrogen content in the leaves of alfalfa plants applied with the composition of the present invention did not significantly increase (FIG. 13, Groups 2 and 3). Therefore, the results shown in FIGS. 13 and 14 indicate that the composition of the present invention and *Rhizobium* have a synergistic effect on GOGAT and nitrogen accumulation in legumes (FIG. 13, Groups 5 and 6).

To sum up, in the presence of *Rhizobium*, the composition of the present invention significantly increases nitrogen fixation in alfalfa plants, thereby increases nitrogen content in leaves and plant growth, with a better effect than inoculation of *Rhizobium* only. Thus, the composition of the present invention promotes the growth of legumes by promoting the formation and growth of nodules.

Example 4 Efficacy Test of Different
Concentrations of the Composition of the Present
Invention on Alfalfa 1. Preparation and Treatment of Test Plants Alfalfa (*Medicago sativa* L.) seeds were sown in 3.5-inch pots containing culture medium (peat soil:vermiculite=1:1). Five (5) seeds were sown in one pot. Alfalfa plants were randomly divided into 8 groups, in which all the 8 groups were inoculated with *Rhizobium* as described in Example 2. After inoculation, the pots were placed in a phytotron, which was operated at 25/23° C. day/night temperature and on a 16/8 h light/dark cycle. Two (2) weeks after sowing (V2 stage), alfalfa plants were applied with the reagents listed in Table 8 once at a rate of 10 mL/12 pots using a foliar spray treatment. The reagents were applied once in total during the test period.

TABLE 8

Summary of the reagents applied to plants in Example 4

| Group | IBA (mg/L) | Choline Chloride (mg/L) | GABA (mg/L) | Tween ® 80, % (v/v) | Rhizobium Inoculation |
|---|---|---|---|---|---|
| Group 1 | 0 | 0 | 0 | 0.1 | + |
| Group 2 | 60 | 0 | 0 | 0.1 | + |
| Group 3 | 0 | 800 | 0 | 0.1 | + |
| Group 4 | 0 | 0 | 500 | 0.1 | + |
| Group 5 | 60 | 800 | 500 | 0.1 | + |
| Group 6 | 1 | 750 | 250 | 0.1 | + |
| Group 7 | 50 | 10 | 750 | 0.1 | + |
| Group 8 | 75 | 500 | 10 | 0.1 | + |

2. Analyses (i) Shoot Weight

Twelve (12) days after the application of reagents, 12 alfalfa plants from each group (N=12) were randomly selected, and the shoot fresh weight of the collected samples was measured.

(ii) Leaf Area

Twelve (12) days after the application of reagents, 12 alfalfa plants from each group (N=12) were randomly selected. All the trifoliate leaves of the selected plants were collected, and leaf area of all the trifoliate leaves of each alfalfa plant was measured by a leaf analyzer (WinFOLIA™ Pro LA2400, Regent Instruments Inc.).

3. Results

Figure 15:
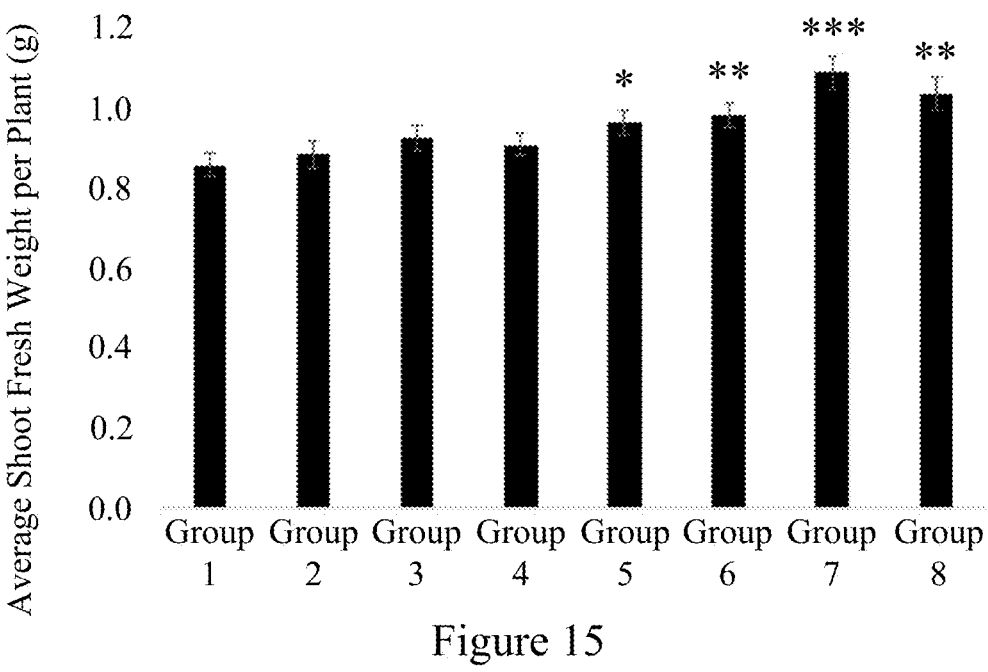
FIG. 15 shows the average shoot fresh weight per alfalfa plant on Day 12 after applied with the test reagents in Example 4 (N=12). Compared to Group 1 (the control group), *$p<0.05$; $p<0.01$; *$p<0.001$.
Figure 16:
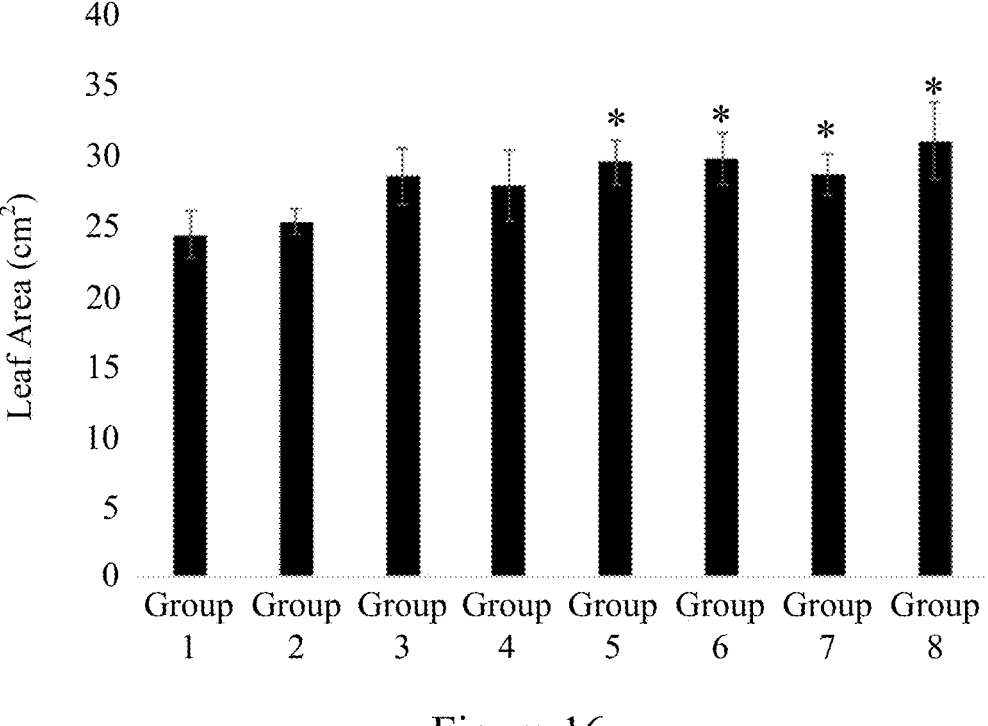
FIG. 16 shows the average leaf area of trifoliate leaves per alfalfa plant on Day 12 after applied with the test reagents in Example 4 (N=12). Compared to Group 1 (the control group), *p<0.05.

The composition of the present invention synergistically promotes the growth of alfalfa plants. On Day 12 after the application of the reagents, compared with the alfalfa plants without any active ingredient (Group 1), the shoot fresh weight (FIG. 15) and the total leaf area (FIG. 16) of the alfalfa plants treated with a single active ingredient (Groups 2 to 4) did not increase significantly. In contrast, compared with the alfalfa plants of Group 1, the alfalfa plants treated with the compositions of the present invention (Groups 5 to 8) had significantly increased shoot fresh weight (FIG. 15) and the total leaf area (FIG. 16) (p<0.05, p<0.01, or p<0.001). These results indicate that the composition of the present invention has a synergistic effect on promoting the growth of alfalfa plants.

Example 5 Soybean Field Trials

1. Preparation and Treatment of Test Plants

Soybean seeds (Kaohsiung 9) were divided into 4 groups and treated with the reagents listed in Table 9. The seeds were planted in field soils at Xinyuan, Pingtung County, Taiwan.

TABLE 9

Summary of the treatment and reagents
applied to plants in Example 5

| Group | IBA (mg/L) | Choline Chloride (mg/L) | GABA (mg/L) | Tween ® 80, % (v/v) | Treatment[#] |
|---|---|---|---|---|---|
| Group 1 (Control) | 0 | 0 | 0 | 0 | None |
| Group 2 | 75 | 300 | 600 | 0.1 | Foliar |
| Group 3 | 75 | 300 | 600 | 0.1 | Seed |
| Group 4 | 75 | 300 | 600 | 0.1 | Seed + Foliar |

[#]Seed: Soybean seeds were soaked in the reagent before sowing (Day 0). Foliar: Soybean plants were applied with the reagent once using a foliar spray treatment on Day 19 after sowing (V1 stage).

2. Analyses (i) Nodule Number

Thirty-four (34) days after sowing, 6-9 soybean plants were randomly collected (N=6-9) for counting the number of nodules.

(ii) Root Dry Weight

Thirty-four (34) days after sowing, 9 soybean plants were randomly selected (N=9). The collected samples were dried at 50° C. overnight, and then the root dry weight was measured.

(iii) Shoot Dry Weight

Thirty-four (34) days after sowing, 9 soybean plants were randomly selected (N=9). Soybean shoots, including leaves and stems but not including pods, were collected and dried at 50° C. overnight, and then the dry weight was measured.

3. Results

Figure 17:
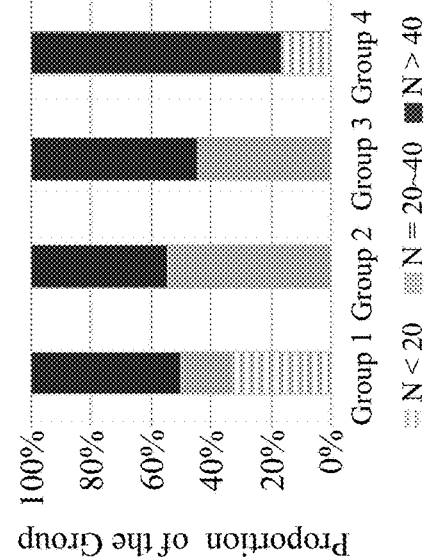
FIG. 17 shows the percentage of soybean plants having certain numbers of nodules on Day 34 after sowing in Example 5 (N=6 to 9). N indicates the nodule number of every soybean plant.

The composition of the present invention increases nodule number of soybean plants. As shown in FIG. 17, on Day 34 after sowing, soybean plants treated with the composition of the present invention (Groups 2 to 4) had more nodule numbers than the control group (Group 1). In particular, over 80% of the soybean plants treated by both seed treatment and foliar spray (Group 4) had more than 40 nodules.

Figure 19:
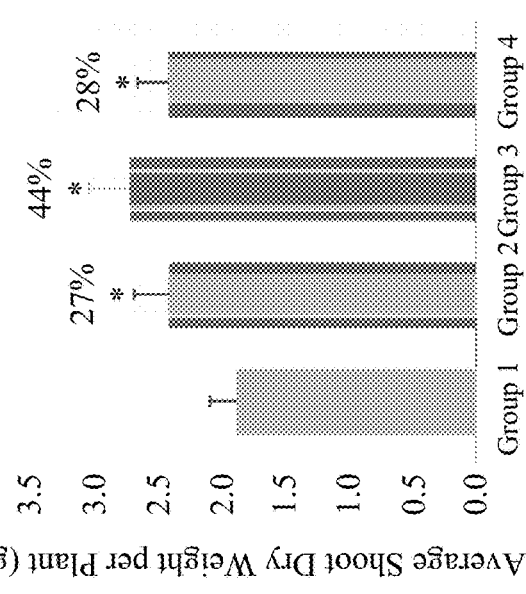
FIG. 19 shows the average shoot dry weight per soybean plant on Day 34 after sowing in Example 5 (N=9). The numbers above the bars of Groups 2 to 4 indicate the percentage increase compared to Group 1 (the control group). *p<0.05.
Figure 18:
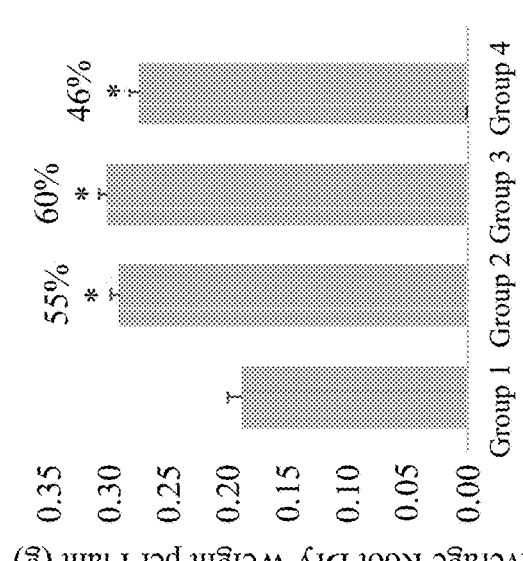
FIG. 18 shows the average root dry weight per soybean plant on Day 34 after sowing in Example 5 (N=9). The numbers above the bars of Groups 2 to 4 indicate the percentage increase compared to Group 1 (the control group). *p<0.05.

The composition of the present invention promotes the growth of soybean plants. On Day 34 after sowing, soybean plants treated with the composition of the present invention (Groups 2 to 4) had a significant increase in both root dry weight (FIG. 18) and shoot dry weight (FIG. 19) (p<0.05). These results show that whether the composition of the present invention is used for seed treatment and/or foliar application, it promotes the formation of soybean nodules, thereby promoting the growth of soybean plants.

To sum up, the Examples above prove that the composition for promoting the growth of legumes of the present invention increase the growth of nodules (including increasing the number of nodules and the weight of nodules) so that the growth of legumes increases (including increasing root dry weight and shoot fresh/dry weight), and thereby the yield increases (including increasing the number of pods and/or seeds).

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A concentrate composition for promoting the growth of legumes, consisting of between about 0.02 g/L to about 50 g/L auxin;

between about 0.2 g/L to about 500 g/L choline chloride;

between about 0.2 g/L to about 500 g/L γ-aminobutyric acid (GABA); and water.

2. The concentrate composition of claim 1, wherein the auxin is selected from indole-3-butyric acid (IBA), indole-3-acetic acid (IAA), 1-naphthaleneacetic acid (NAA), 2-phenylacetic acid (PAA), and indole-3-propionic acid (IPA).

3. The concentrate composition of claim 1, wherein the concentrate composition for promoting the growth of legumes is diluted about 20 to about 500 folds before use.

4. The concentrate composition of claim 1, wherein the concentrate composition promotes the growth of legumes by at least one of the methods selected from the group consisting of increasing the yield, increasing root dry weight, increasing nodule weight and/or number, increasing leaf area, increasing leaf fresh weight and/or dry weight, increasing nitrogen content in leaves, increasing soluble protein in leaves, increasing pod number, and increasing seed weight and/or number.

5. A ready-to-use composition for promoting the growth of legumes, consisting of between about 0.2 mg/L to about 500 mg/L auxin;

between about 2 mg/L to about 5000 mg/L choline chloride;

between about 2 mg/L to about 5000 mg/L γ-aminobutyric acid (GABA);

0% or 0.01-1% (v/v) adjuvant; and water.

6. The ready-to-use composition of claim 5, wherein the auxin is selected from indole-3-butyric acid (IBA), indole-3-acetic acid (IAA), 1-naphthaleneacetic acid (NAA), 2-phenylacetic acid (PAA), and indole-3-propionic acid (IPA).

7. The ready-to-use composition of claim 5, wherein adjuvant is a surfactant.

8. The ready-to-use composition of claim 5, wherein adjuvant is a drift control agent.

9. The ready-to-use composition of claim 5, wherein the ready-to-use composition promotes the growth of legumes by at least one of the methods selected from the group consisting of increasing the yield, increasing root dry weight, increasing nodule weight and/or number, increasing leaf area, increasing leaf fresh weight and/or dry weight, increasing nitrogen content in leaves, increasing soluble protein in leaves, increasing pod number, and increasing seed weight and/or number.

10. A method for promoting the growth of legumes, comprising a step of applying a use solution composition to a leguminous plant, and the solution composition consisting of between about 0.2 mg/L to about 500 mg/L auxin;

between about 2 mg/L to about 5000 mg/L choline chloride;

between about 2 mg/L to about 5000 mg/L γ-aminobutyric acid (GABA);

0% or 0.01-1% (v/v) adjuvant; and water.

11. The method of claim 10, wherein the auxin is selected from indole-3-butyric acid (IBA), indole-3-acetic acid (IAA), 1-naphthaleneacetic acid (NAA), 2-phenylacetic acid (PAA), and indole-3-propionic acid (IPA).

12. The method of claim 10, wherein the adjuvant is added to the solution composition before the step of applying the use solution composition to the leguminous plant.

13. The method of claim 10, wherein the adjuvant is a surfactant.

14. The method of claim 10, wherein the adjuvant is a drift control agent.

15. The method of claim 10, wherein the solution composition is applied to seeds of the leguminous plant.

16. The method of claim 10, wherein the solution composition is applied to foliage of the leguminous plant.

17. The method of claim 10, wherein the solution composition is applied to roots of the leguminous plant.

18. The method of claim 10, wherein the use solution composition promotes the growth of legumes by at least one of the methods selected from the group consisting of increasing the yield, increasing root dry weight, increasing nodule weight and/or number, increasing leaf area, increasing leaf fresh weight and/or dry weight, increasing nitrogen content in leaves, increasing soluble protein in leaves, increasing pod number, and increasing seed weight and/or number.

* * * * *